C. S. LOCKWOOD.
SLEEVE TO GUIDE THE CAGES IN ROLLER BEARINGS.
APPLICATION FILED JUNE 7, 1909.

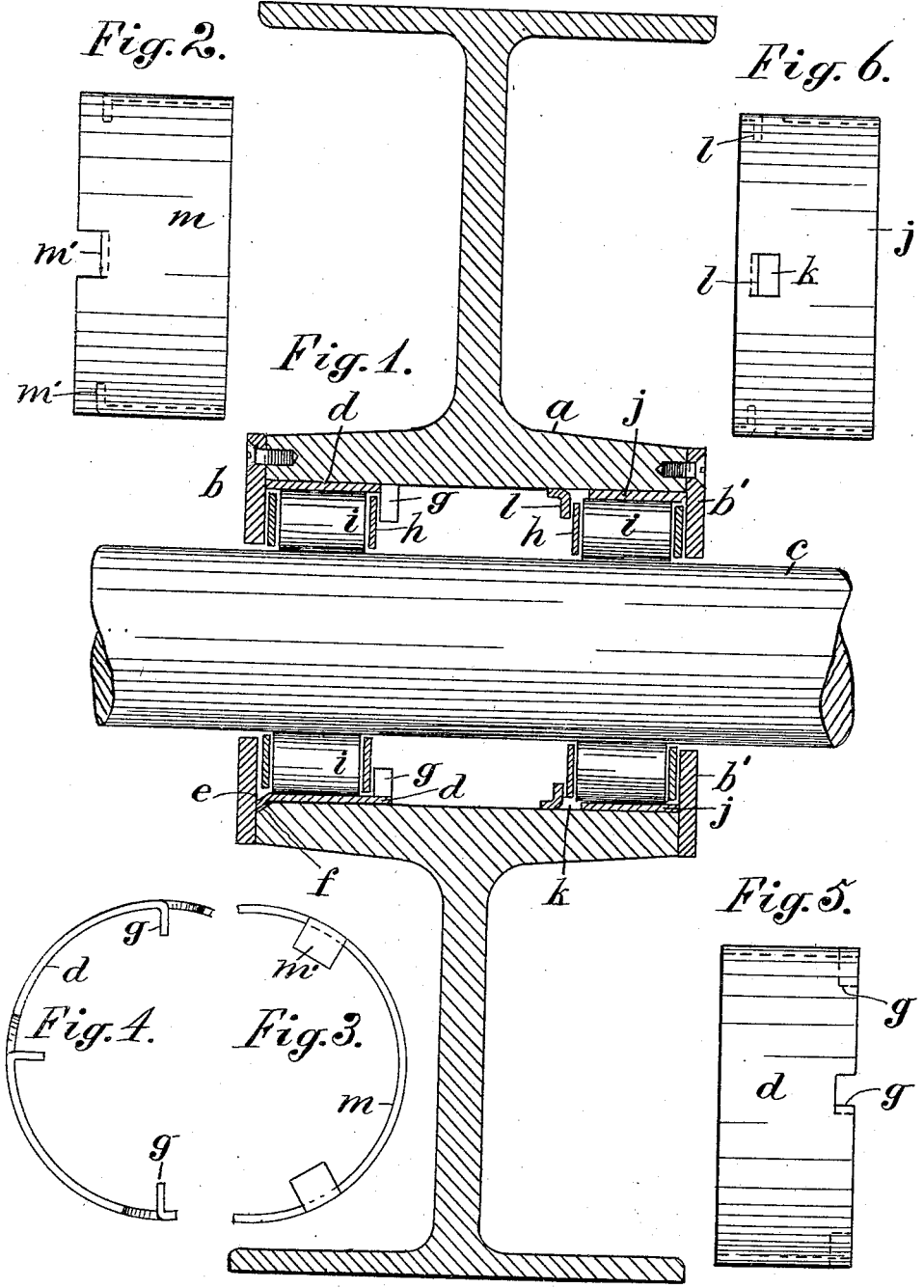

979,317.

Patented Dec. 20, 1910.
2 SHEETS—SHEET 2.

Witnesses:
L. Lee.
J. W. Greenbaum.

Inventor.
Charles S. Lockwood, pr
Thomas S. Crane, atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

SLEEVE TO GUIDE THE CAGES IN ROLLER-BEARINGS.

979,317.     Specification of Letters Patent.     Patented Dec. 20, 1910.

Application filed June 7, 1909. Serial No. 500,520.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Sleeves to Guide the Cages in Roller-Bearings, fully described and represented in the following specification and the accompanying drawings, forming a part of the same.

The object of this invention is to furnish a wearing-sleeve applied to the casing of a roller bearing or to the journal fitted therein, with integral means adapted to guide a cage and set of rolls in their rotation about the shaft in contact with such sleeve.

The invention consists of integral tongues bent from the metal of the sleeve at or near one or both ends, at right angles to its cylindrical surface adjacent to one end of the cage, so as to guide the cage in its rotation around the journal. If the sleeve has tongues at both ends, it is obviously necessary to bend the tongues upward from the sleeve at one of those ends after the cage with rolls is applied to the sleeve, and the flexible nature of such tongues permits this to be done without difficulty.

The casing of a roller bearing is commonly closed at the ends with integral or detachable heads, to retain oil in the bearing for lubricating the rolls, and the cage is restrained at one end in its movements by such head, so that in many cases it is only necessary to provide the sleeve with the integral tongues at the opposite end, to hold the cage in the desired path within the casing.

The invention is especially adapted for application to the hub of a pulley which is meant to turn loosely upon a shaft, as the hub serves for the casing of the roller bearing, and a sleeve can be readily fitted within each end of the pulley-hub, and sets of rolls fitted within such sleeves and held in place by tongues on the sleeves.

The sleeve provided with the present improvement may be fitted to either the casing of the bearing or to the shaft-journal which revolves therein, as will be understood by reference to the annexed drawing, in which—

Figure 7:
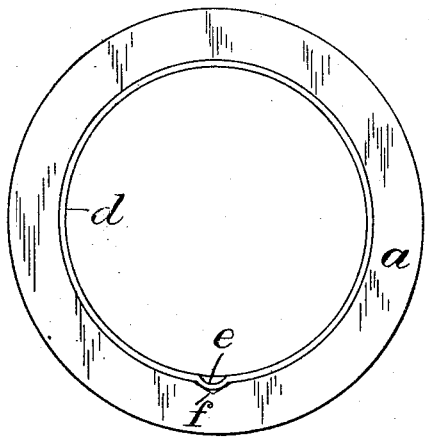
Figure 10:
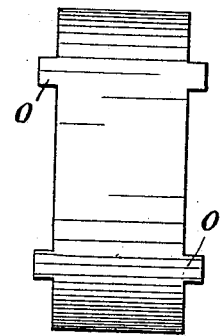
Figure 8:
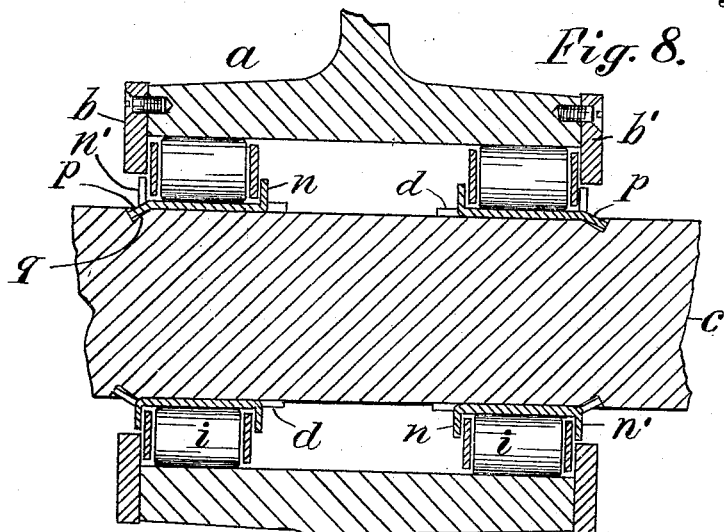
Figure 9:
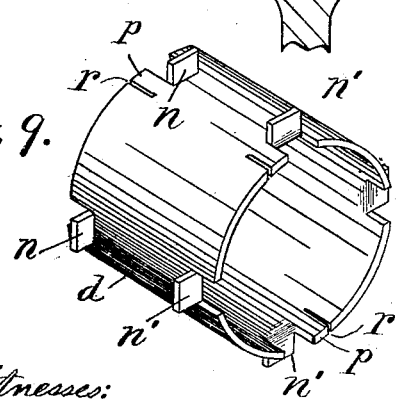
Figure 11:
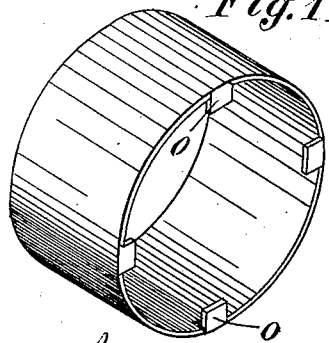

Figure 1 is a longitudinal section where hatched of a loose pulley with rolls inside the opposite ends of the hub; Fig. 2 is a side view of a sleeve showing tongues cut and bent inwardly to stand flatwise inside one end of such sleeve; Fig. 3 is an end view of part of such sleeve; Fig. 4 shows part of a sleeve with tongues cut and bent inwardly to stand edgewise inside one end of such sleeve; Fig. 5 is a side view of a sleeve showing tongues set edgewise as in Fig. 4; Fig. 6 shows tongues punched from slots in the sleeve near one end; Fig. 7 is an end view of the hub and sleeve shown in Fig. 1, with the head $b$ removed from the hub; Fig. 8 shows a hub similar to Fig. 1 with a shaft having a sleeve with tongues bent thereon at both ends; and Fig. 9 is a perspective view of such sleeve. Figs. 10 and 11 show a similar sleeve for lining the casing.

In Fig. 1, $a$ designates a pulley-hub, $b$, $b'$, heads secured upon the opposite ends and projected inwardly toward the shaft $c$. $d$ is a sleeve like that shown in Fig. 5 fitted within one end of the hub and retained therein by forming a dent $e$ in the outer end of the sleeve, the metal being driven by a punch into a notch $f$ in the outer end of the hub, as shown in Figs. 1 and 7. Such dent holds the sleeve from inward movement while the head $b$ holds it from outward movement, thus securing the sleeve positively in one end of the hub. The integral tongues are cut upon one or both of their edges from the substance of the sleeve, and when bent inwardly, leave an open slot or aperture through the sleeve. The inner end of the sleeve in Fig. 5 has integral tongues $g$ cut therefrom and bent inwardly at right angles to the cylindrical surface, and edgewise to the side of the cage $h$ which carries the rolls $i$. Sleeves of the character described herein are commonly made of sheet-metal or at least of metal thin enough to have the tongues readily cut upon the same and then bent by suitable means at right angles to the periphery of the sleeve. The sleeve and the cage are so proportioned that the cage turns freely between the head $b$ and the tongue $g$, and is thus guided in a uniform path around the shaft. In the opposite end of the same hub, a sleeve $j$ is shown like that illustrated in Fig. 6, where slots $k$ are punched in the sleeve near one end, with integral tongues $l$ bent from the outer end of such slots inwardly at right angles to the cylindrical surface, and flatwise to the side of a cage $h$ which is fitted between such tongues and the head $b'$.

Fig. 2 shows tongues $m'$ formed near one end of a sleeve $m$ by cutting two slits inwardly from such edge, and bending the metal between such slits within the sleeve, thus furnishing tongues at the ends of the slots equivalent to the tongues $l$ in Figs. 1 and 6; but the tongues bent from slots, as in Fig. 6, may stand somewhat nearer the end of the sleeve; and a shorter sleeve thus be used to furnish the tongues.

Fig. 8 shows the cage guided entirely by tongues $n$, $n'$, bent from opposite ends of the sleeves $d$ upon the shaft $c$, the tongues $n$ being bent at one end of the sleeve before the cage is applied thereto, and the tongues at the opposite end then bent into the required position to retain the cage upon the sleeve. Such a construction for the sleeve of the shaft enables the sleeve to hold the cage and rolls together in transportation, in readiness for application to the shaft, and serves to guide the cage in the casing independently of the casing itself. Such result is secured by making both the cage and sleeve undivided so that both are of circular form, and the cage can only be applied to the sleeve endwise.

In Fig. 9 an auxiliary tongue $p$ is shown adjacent to one of the tongues $n$, and the sleeve may be secured upon the shaft by bending such tongue $p$ downwardly into a notch $q$ in the shaft, as indicated at one end of the sleeve in Fig. 8.

Fig. 9 shows the appearance of the sleeve $d$ with the tongues $n$—$n'$ bent up at both ends; and the sleeve slotted at $r$ to furnish the tongue $p$ for locking the sleeve to a notched shaft.

Figs. 10 and 11 show a lining sleeve with tongues $o$ to bend inwardly at both ends to retain the cage therein. The sleeve $d$ may have one set of the tongues $n$ or $n'$ bent upwardly, and the cage and rolls then applied thereto, and the other set of tongues bent upward, thus securing the cage movably on the sleeve; and forming a self-contained sleeve and rolls in a very convenient form for transportation, and ready for application to a suitable shaft at any desired point.

As several forms of the tongue to guide the rolls are shown in the drawing, it will be understood that the shape of the tongues is not material or the part of the sleeve from which they are bent to perform the functions claimed herein. It will be understood that the sleeve may be used to carry the cage and rolls in a self-contained structure, whether the sleeve be one made to fit the shaft or one made to fit the casing, as in either case the lugs upon the sleeve project toward the ends of the cage and serve to hold it upon the sleeve. Fig. 10 shows the tongues projected from the ends of the sleeve, which brings the tongues at the extreme end of the sleeve when bent inwardly as shown in Fig. 11.

It will be understood that in all the constructions shown the metal of the sleeve is malleable so as to permit the bending of the tongues when cut therefrom, such malleability permitting the tongues to be bent by hand upon one end of the sleeve so as to secure a cage within or upon a sleeve after it is applied thereto.

I am aware that it is common to form sleeves for a casing, or for an axle, with an integral flange spun or otherwise formed upon the end of the sleeve; but an integral flange cannot readily be spun upon the end of a sleeve after a cage with contained rolls is applied to such a sleeve; whereas the tongues shown herein can be readily bent into the required position by a hand-tool after a cage with rolls has been applied to the sleeve. I do not, therefore, claim the use broadly of means to hold a cage upon a sleeve, but the sleeve formed with integral tongues as shown herein, adapted to be bent by a hand-tool.

Having thus set forth the nature of the invention what is claimed herein is:

1. In a roller bearing, the combination, with a casing and a shaft journal, of an integral cylindrical sleeve, an undivided cage of circular form with a series of rolls therein and adapted to slip endwise upon the sleeve, the sleeve having slots near its ends and tongues having parallel edges separated from the substance of the sleeve at the side of such slots and adapted to be bent inwardly by a hand-tool at the end of said slot at right angles to the periphery of the sleeve, to retain and guide the cage upon the sleeve in its rotations within the casing.

2. In a roller bearing, the combination, with a casing and a shaft-journal, of a sleeve fitted to the casing and secured from end movement therein, a head upon the casing adjacent to the outer end of the sleeve, a cage with rolls fitted to the sleeve between the journal and casing and tongues formed upon the inner end of the sleeve and bent at right angles thereto adjacent to the inner end of the cage, whereby the tongues and the casing-head form guides for the rotation of the cage.

3. In a roller bearing for loose pulleys, the combination, with the pulley-hub forming the casing of the bearing, of heads upon the opposite ends of such hub projected toward the shaft, separate sleeves fitted within the hub at opposite ends adjacent the said heads and having tongues at their inner ends bent at right angles to their periphery, and a cage with a set of rolls fitted within the sleeve in each end of the hub between the head and the said tongues and guided thereby in their rotations around the shaft.

In testimony whereof I have hereunto set my hand in the presence of two subscribing witnesses.

CHARLES S. LOCKWOOD.

Witnesses:
CHARLES R. COOK,
IRENE M. SCHREIBER.